US009915092B2

(12) United States Patent
Lee et al.

(10) Patent No.: US 9,915,092 B2
(45) Date of Patent: Mar. 13, 2018

(54) SEALING APPARATUS FOR VACUUM WINDOW MANUFACTURING EQUIPMENT

(71) Applicant: JOEUN TECHNOLOGY CO., LTD., Cheonan-si (KR)

(72) Inventors: Young Weon Lee, Seoul (KR); Dong Yeul Shin, Seoul (KR)

(73) Assignee: JOEUN TECHNOLOGY CO., LTD., Cheonan-si (KR)

( * ) Notice: Subject to any disclaimer, the term of this patent is extended or adjusted under 35 U.S.C. 154(b) by 366 days.

(21) Appl. No.: 14/770,720

(22) PCT Filed: Feb. 26, 2014

(86) PCT No.: PCT/KR2014/001540

§ 371 (c)(1),
(2) Date: Aug. 26, 2015

(87) PCT Pub. No.: WO2014/133305

PCT Pub. Date: Sep. 4, 2014

(65) Prior Publication Data

US 2016/0002972 A1 Jan. 7, 2016

(30) Foreign Application Priority Data

Feb. 26, 2013 (KR) ........................ 10-2013-0020665

(51) Int. Cl.
*E06B 3/677* (2006.01)
*B23P 19/00* (2006.01)
*B23P 19/04* (2006.01)

(52) U.S. Cl.
CPC .................................. *E06B 3/6775* (2013.01)

(58) Field of Classification Search
CPC . Y10T 29/53191; Y10T 29/53; B25B 11/005; B23P 19/004; B23P 19/005; B23P 19/008; B23P 19/007

(Continued)

(56) References Cited

U.S. PATENT DOCUMENTS 5,643,644 A * 7/1997 Demars ................. C03B 23/245 428/34
5,855,638 A * 1/1999 Demars ................. C03B 23/245 65/32.2

(Continued)

FOREIGN PATENT DOCUMENTS

KR 101042725 6/2011
KR 101058170 8/2011

(Continued)

OTHER PUBLICATIONS

International Search Report—PCT/KR2014/001540 dated Jun. 24, 2014.
Written Opinion—PCT/KR2014/001540 dated Jun. 24, 2014.

*Primary Examiner* — Ryan J Walters
*Assistant Examiner* — Lawrence Averick
(74) *Attorney, Agent, or Firm* — Cantor Colburn LLP

(57) ABSTRACT

The present invention relates to a sealing apparatus for vacuum window manufacturing equipment, the sealing apparatus being configured to cover a vacuum hole formed in at least one glass plate for a vacuum window with a cover. The sealing apparatus includes: a vacuum chamber including an internal space and configured to be evacuated for forming a vacuum therein; a cartridge installed in the internal space and accommodating a plurality of covers; a cartridge elevator installed on the vacuum chamber and configured to sequentially lift or lower the cartridge; a cover transfer device installed in the internal space and configured to transfer the covers one by one from the cartridge; a cover-rest head configured to receive a cover from the cover transfer device; and a head elevator configured to lift up the cover-rest head to the vacuum hole of the glass plate.

10 Claims, 6 Drawing Sheets

(58) Field of Classification Search
USPC .................................................. 65/34; 156/87
See application file for complete search history.

(56) References Cited

U.S. PATENT DOCUMENTS

| | | | | |
|---|---|---|---|---|
| 6,401,331 | B1 * | 6/2002 | Mizuno ................. | B23P 19/007 29/754 |
| 7,922,842 | B2 * | 4/2011 | Vianello ............. | E06B 3/67343 156/105 |
| 8,297,139 | B2 * | 10/2012 | McArdle ............... | B23P 19/007 414/589 |
| 2010/0282771 | A1 * | 11/2010 | Auriol ...................... | B21J 15/32 221/278 |
| 2011/0195206 | A1 * | 8/2011 | Colson ...................... | E04C 2/54 428/34 |
| 2014/0290047 | A1 * | 10/2014 | Mizuno ............... | H01L 21/6838 29/705 |
| 2014/0335518 | A1 * | 11/2014 | Angros ..................... | B01L 3/52 435/6.11 |
| 2016/0031256 | A1 * | 2/2016 | Henry ...................... | B43K 8/02 29/801 |

FOREIGN PATENT DOCUMENTS

| | | |
|---|---|---|
| KR | 1020110090616 | 8/2011 |
| KR | 1020120009788 | 2/2012 |

* cited by examiner

[Fig. 1]
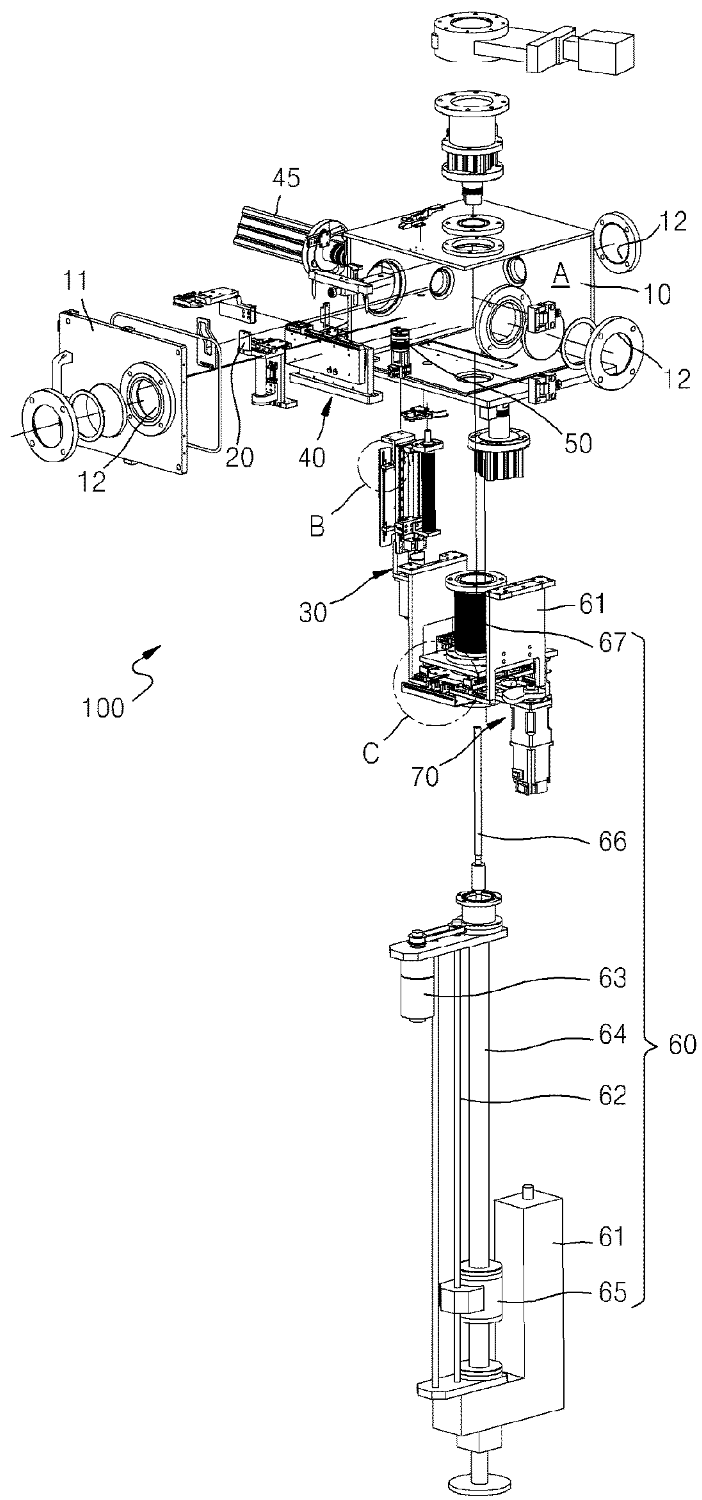

[Fig. 2]
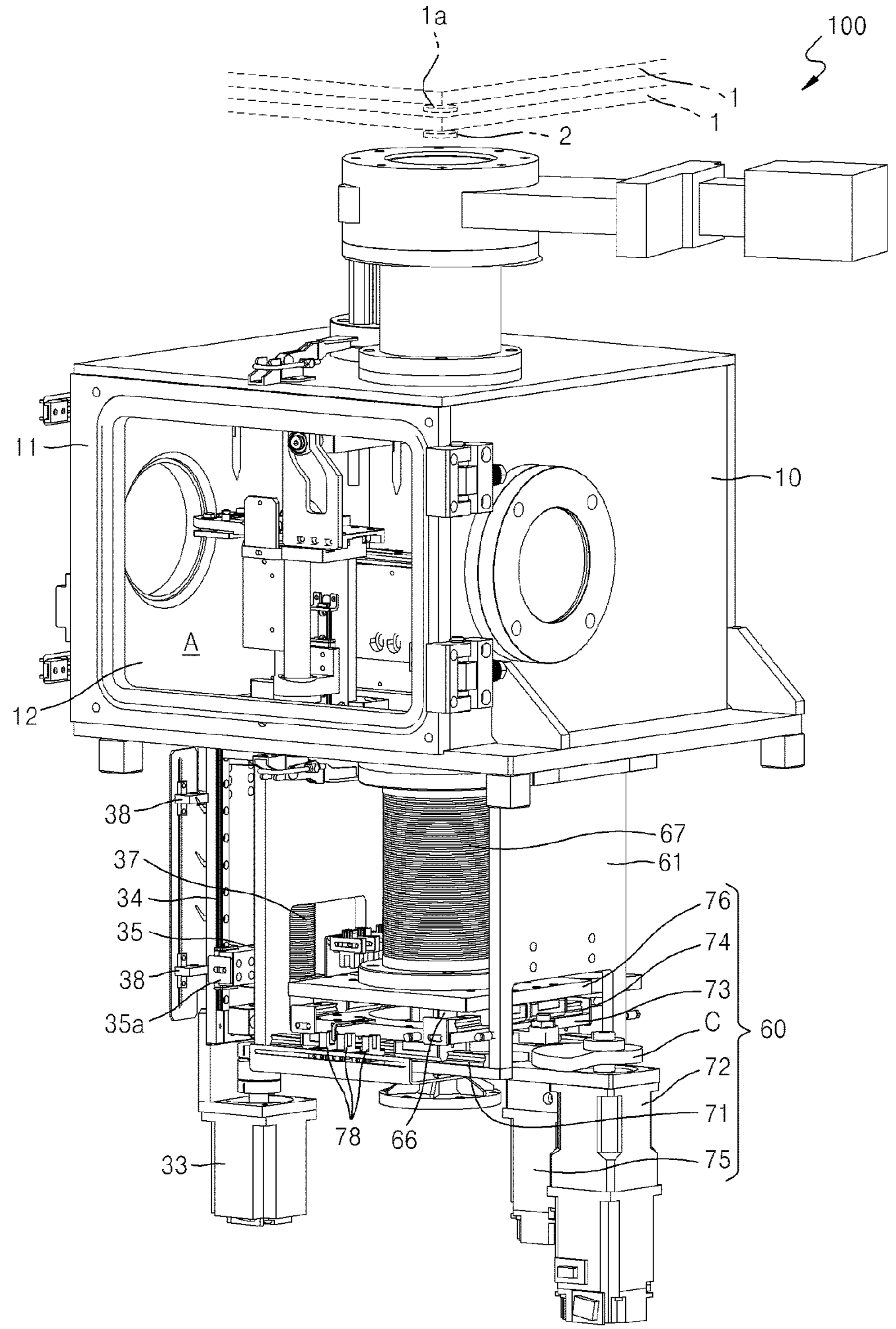

[Fig. 3]
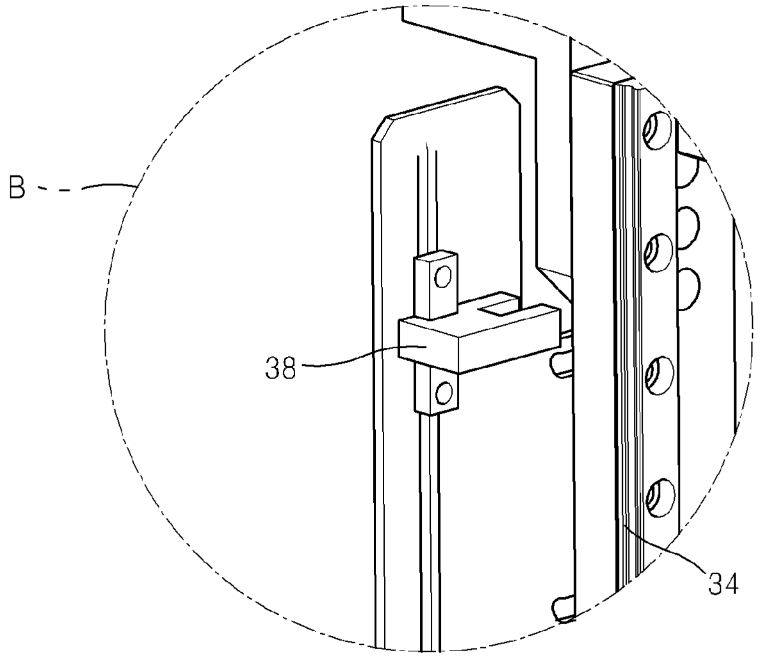
[Fig. 4]
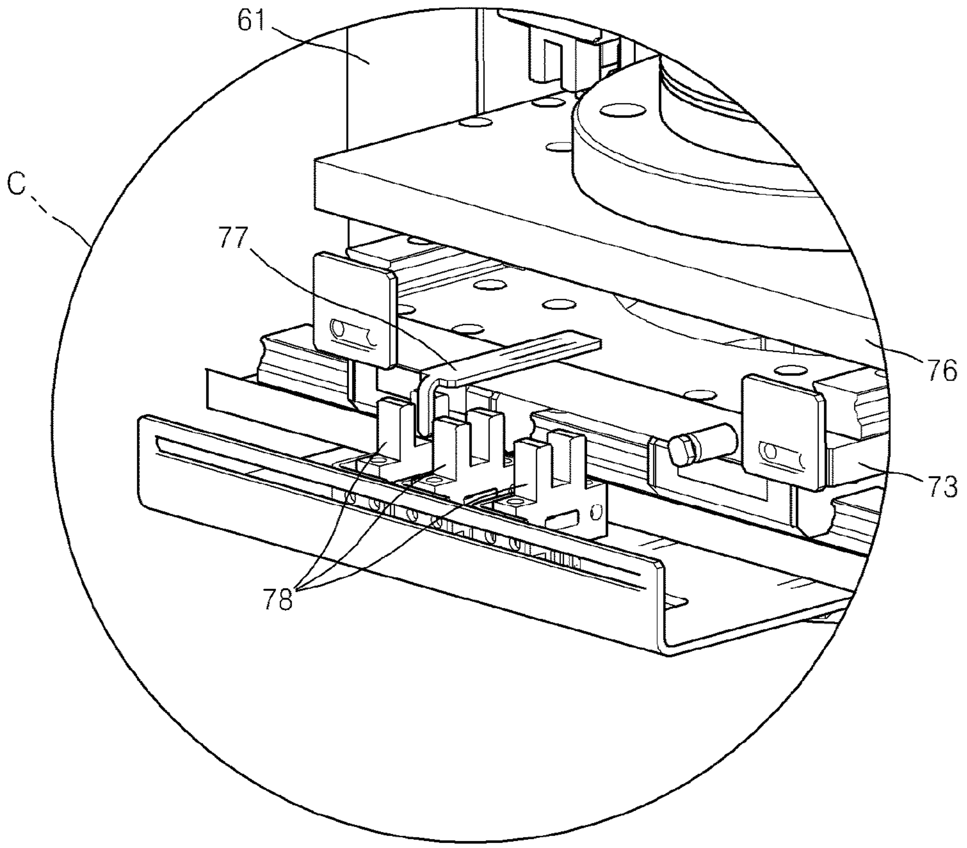

[Fig. 5]
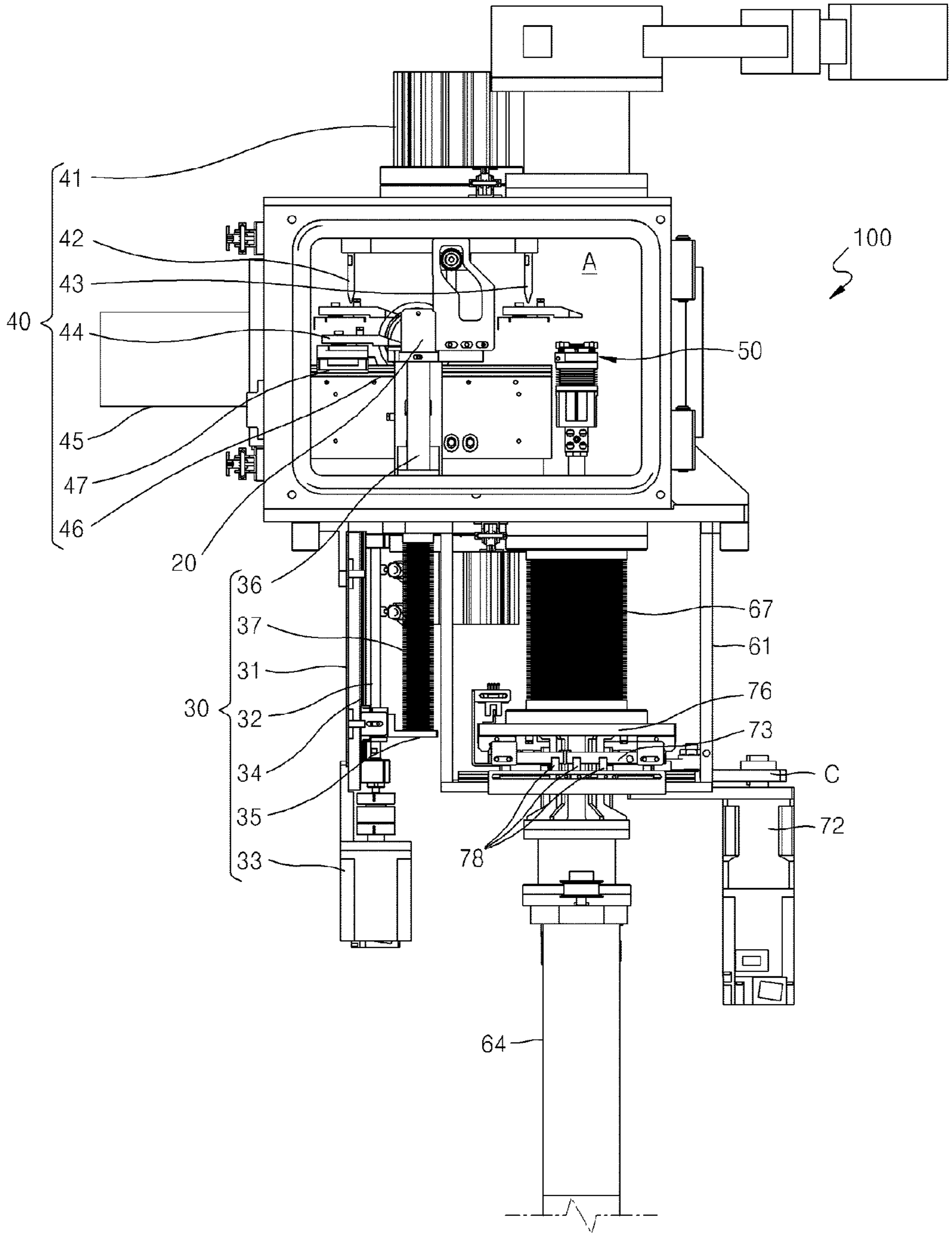

[Fig. 6]
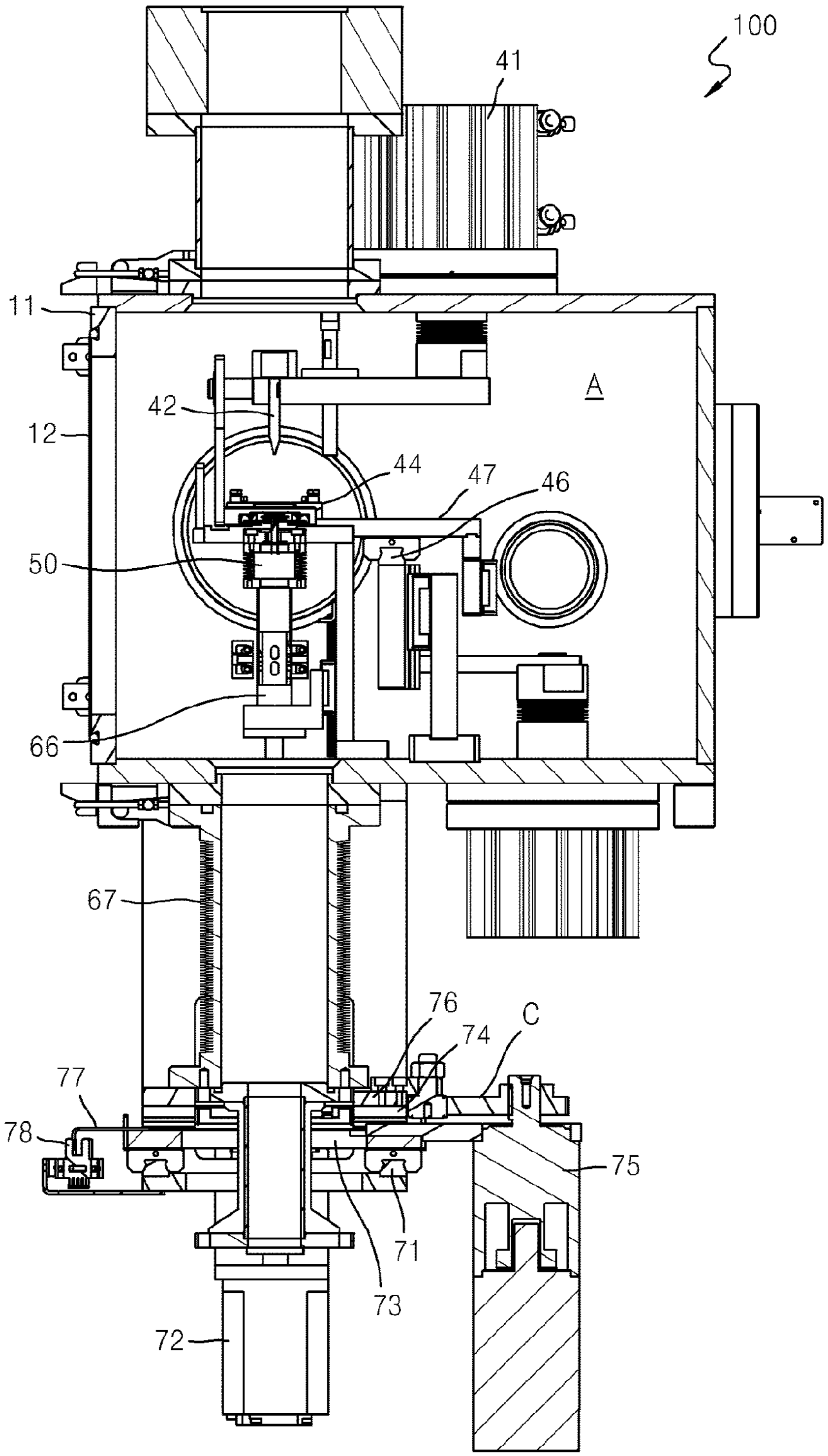

[Fig. 7]
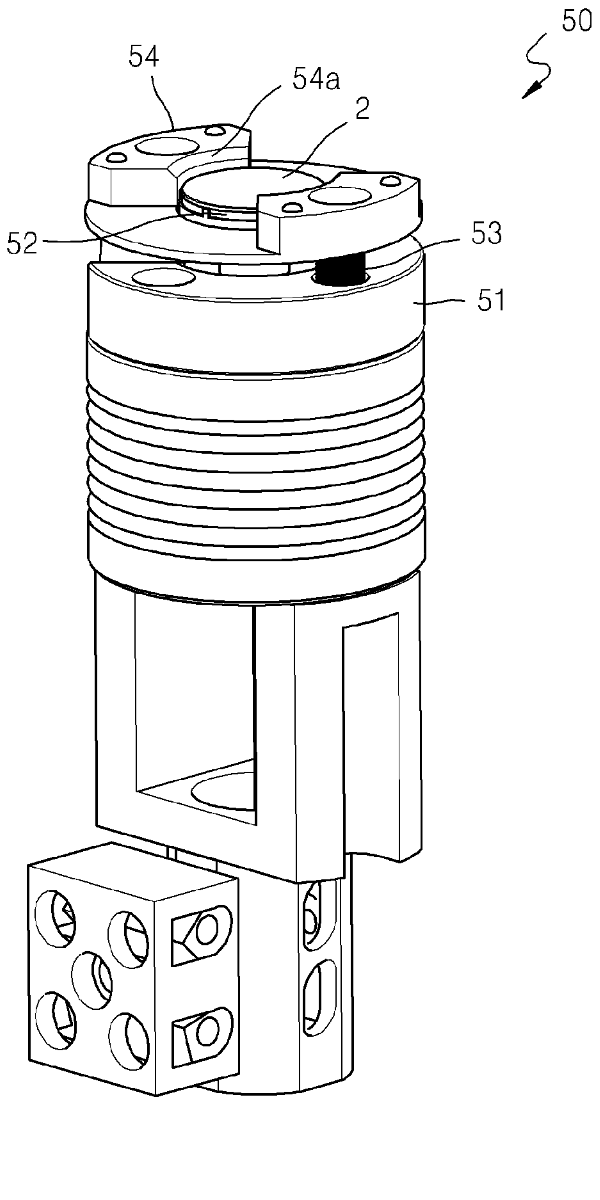

SEALING APPARATUS FOR VACUUM WINDOW MANUFACTURING EQUIPMENT

TECHNICAL FIELD

The present invention relates to a sealing apparatus for vacuum window manufacturing equipment, and more particularly, to a sealing apparatus for vacuum window manufacturing equipment, the sealing apparatus being configured to close a vacuum hole of a glass plate for a vacuum window with a cover.

BACKGROUND ART

In general, a vacuum window refers to a kind of glass window in which a vacuum is formed between upper and lower plates thereof for blocking noise and vibrations and improving thermal insulation by blocking thermal energy transferred from the outside.

In the related art, vacuum windows are manufactured by applying a frit (frit seal) to the edges of a glass plate including a pair of upper and lower plates, heat treating the glass plate, cooling the glass plate at room temperature, and creating a vacuum between the upper and lower plates.

Particularly, an exhaust hole is formed in the lower plate, and a tip in the form of a short pipe is attached to the exhaust hole. Then, a vacuum hose is connected to the tip, and air is discharged from between the upper and lower plates to create a vacuum. Thereafter, the vacuum hose is removed, and the tip is welded to seal the vacuum.

However, vacuum windows manufacturing according to the above-described method of the related art have many problems such as forming of vacuum windows having uneven surfaces due to tips fused to lower plates and protruding therefrom, low functionality caused by a low degree of vacuum created using the vacuum hose, product damage caused by protruding tips vulnerable to impacts.

Particularly, since pallets for transferring large vacuum windows under high-temperature, high-vacuum-degree conditions have not yet been developed for the vacuum window manufacturing method, a series of processes has to be manually performed. That is, process automation and automatic line production are impossible. As a result, productivity is very low.

DETAILED DESCRIPTION OF THE INVENTIVE CONCEPT

Technical Problem

The present invention provides a sealing apparatus for vacuum window manufacturing equipment, the sealing apparatus being configured to seal a vacuum hole of a glass plate for a vacuum window with a cover when the glass plate is transferred along an automatic manufacturing line, thereby facilitating process automation and improving productivity.

Technical Solution

According to an aspect of the present invention for solving the technical problem, there is provided a sealing apparatus for vacuum window manufacturing equipment, the sealing apparatus being configured to cover a vacuum hole formed in at least one glass plate for a vacuum window with a cover. The sealing apparatus may include: a vacuum chamber including an internal space and configured to be evacuated for forming a vacuum therein; a cartridge installed in the internal space and accommodating a plurality of covers; a cartridge elevator installed on the vacuum chamber and configured to sequentially lift or lower the cartridge; a cover transfer device installed in the internal space and configured to transfer the covers one by one from the cartridge; a cover-rest head configured to receive a cover from the cover transfer device; and a head elevator configured to lift up the cover-rest head to the vacuum hole of the glass plate.

In addition, according to the prevent invention, the vacuum chamber may include: a door on a side thereof; and a window configured to allow checking an inside state of the vacuum chamber.

In addition, according to the prevent invention, the cartridge elevator may include: a fixed frame fixed to the vacuum chamber; screw rod installed on the fixed frame; a rotation motor configured to rotate the screw rod; a guide member installed on the fixed frame; a movable base into which the screw rod is inserted in a screw engagement manner so that the movable base is lifted or lowered along the guide member; an extension rod installed on the movable base and extending from the movable base to the cartridge; and a bellows tube installed between the movable base and the vacuum chamber and enclosing the extension rod.

In addition, according to the prevent invention, the cartridge elevator may further include a limit optical sensor installed on the fixed frame and configured to detect a detection protrusion on the movable base.

In addition, according to the prevent invention, the cover transfer device may include: elastic fingers configured to be selectively closed or opened by a first wedge member and a second wedge member lifted or lowered by a first cylinder; and a finger table on which the elastic fingers are installed, the finger table being configured to be moved by a second cylinder along a finger transfer rail installed in the vacuum chamber.

In addition, according to the prevent invention, the cover-rest head may include: a head body; a heater installed on the head body and configured to heat the cover; and an elastic guide connected to an elastic spring installed on the head body and configured to elastically move backward to a lower side of the cover when a force is applied thereto, the elastic guide including a guide groove to guide the cover.

In addition, according to the prevent invention, the head elevator may include: a fixed frame fixed to the vacuum chamber; a screw rod installed on the fixed frame; a rotation motor configured to rotate the screw rod; a guide member installed on the fixed frame; a movable base into which the screw rod is inserted in a screw engagement manner so that the movable base is lifted or lowered along the guide member; an extension rod installed on the movable base and extending from the movable base to the cover-rest head; and a bellows tube installed between the movable base and the vacuum chamber and enclosing the extension rod.

In addition, according to the prevent invention, the head elevator may further include a position adjustment device installed between the extension rod and the cover-rest head and configured to move the cover-rest head in x-axis and y-axis directions.

In addition, according to the prevent invention, the position adjustment device may include: a y-axis movable base configured to be moved in the y-axis direction by a y-axis transfer motor along a y-axis rail installed on the fixed frame; and an x-axis movable base configured to be moved in the x-axis direction by an x-axis transfer motor along an x-axis rail installed on the y-axis movable base, the x-axis movable base being connected to the extension rod.

In addition, according to the prevent invention, the position adjustment device may further include a limit optical sensor installed on the fixed frame and configured to detect a detection protrusion on the y-axis movable base.

Advantageous Effects

According to the present invention, the sealing apparatus for vacuum window manufacturing equipment is provided to close and seal a vacuum hole of a glass plate for a vacuum window with a cover and to thus facilitate process automation and improve the productivity and precision of the vacuum window manufacturing equipment.

DESCRIPTION OF THE DRAWINGS

FIG. 1 is an exploded perspective view illustrating a sealing apparatus for vacuum window manufacturing equipment according to some embodiments of the present invention.

FIG. 2 is an enlarged perspective view illustrating an assembled state of a vacuum chamber illustrated in FIG. 1.

FIG. 3 is an enlarged perspective view illustrating a portion B of FIG. 1.

FIG. 4 is an enlarged perspective view illustrating a portion C of FIG. 1.

FIG. 5 is a front view illustrating the vacuum chamber illustrated in FIG. 2.

FIG. 6 is a side sectional view illustrating the vacuum chamber illustrated in FIG. 2.

FIG. 7 is a perspective view illustrating a cover-rest head illustrated in FIG. 1.

BEST MODE

Exemplary embodiments of the present invention will now be described in detail with reference to the accompanying drawings.

The present invention may, however, be embodied in many different forms and should not be construed as being limited to the embodiments set forth herein; rather, these embodiments are provided to give a clear understanding of the present invention to those of ordinary skill in the art. That is, the embodiments are provided so that this disclosure will be thorough and complete, and will fully convey the inventive concept to those of ordinary skill in the art. In the accompanying drawings, the thickness or size of each layer are exaggerated for illustrative purposes and clarity.

In the specification, when an element such as a film, a region, or a substrate is referred to as being "above," "on," "connected to,", "disposed on," or "coupled to" another element, it can be directly "above," "on," "connected to,", "disposed on," or "coupled to" the other element, or intervening elements may also be present. However, when an element is referred to as being "directly on or above," or "directly coupled to" another element, no intervening element is present. In the drawings, like reference numerals denote like elements. As used herein, the term "and/or" includes any and all combinations of one or more of the associated listed items.

It will be understood that, although the terms first, second, etc. may be used herein to describe various members, components, regions, layers, and/or sections, these members, components, regions, layers, and/or sections should not be limited by these terms. These terms are only used to distinguish one member, component, region, layer or section from another member, component, region, layer, or section. Thus, a first member, component, region, layer, or section, discussed below could be termed a second member, component, region, layer, or section without departing from the teachings of the present invention.

Spatially relative terms, such as "on," "above," "upper," "beneath," "below," "lower," and the like, may be used herein to describe one element's relationship to another element(s) as illustrated in the drawings. It will be understood that the spatially relative terms are intended to encompass different orientations of the device in use or operation in addition to the orientation depicted in the drawings. For example, if the device in the drawings is turned over, elements described as "above" other elements would then be oriented "below" or "beneath" the other elements. Thus, the exemplary term "above" may encompass both orientations of above and below. The device may be otherwise oriented (rotated 90 degrees or in other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated shapes, integers, steps, operations, members, elements, and/or groups thereof, but do not preclude the presence or addition of one or more other shapes, integers, steps, operations, members, elements, and/or groups thereof.

Hereinafter, exemplary embodiments of the present invention will be described with reference to the accompanying drawings in which ideal embodiments are illustrated. Shapes illustrated in the drawings may be varied according to various factors such as manufacturing methods and/or tolerances. That is, the embodiments of the present invention are not limited to particular shapes illustrated in the drawings. Factors such as shape changes in manufacturing processes should be considered.

FIG. 1 is an exploded perspective view illustrating a sealing apparatus 100 for vacuum window manufacturing equipment according to some embodiments of the present invention; FIG. 2 is an enlarged perspective view illustrating an assembled state of a vacuum chamber 10 illustrated in FIG. 1; FIG. 3 is an enlarged perspective view illustrating a portion B of FIG. 1; FIG. 4 is an enlarged perspective view illustrating a portion C of FIG. 1; FIG. 5 is a front view illustrating the vacuum chamber 10 illustrated in FIG. 2; and FIG. 6 is a side sectional view illustrating the vacuum chamber 10 illustrated in FIG. 2.

First, according to some embodiments of the present invention illustrated in FIGS. 1 to 6, the sealing apparatus 100 for vacuum window manufacturing equipment may be used to cover a vacuum hole 1*a* formed in at least one glass plate 1 for a vacuum window with a cover 2. The sealing apparatus 100 may mainly include the vacuum chamber 10, a cartridge 20, a cartridge elevator 30, a cover transfer device 40, a cover-rest head 50, and a head elevator 60.

As shown in FIGS. 1 to 6, the vacuum chamber 10 may be a chamber structure including an internal space A in which a vacuum can be formed.

A door 11 may be installed on a side of the vacuum chamber 10 as shown in FIGS. 1 to 6, so as to supply or replace components through the door 11. In addition, the vacuum chamber 10 may include a window 12 so that workers may observe the inside of the vacuum chamber 10 with the naked eye.

The cartridge 20 may be a structure installed in the internal space A of the vacuum chamber 10 to accommodate a stack of covers 2, and the cartridge 20 may be sequentially lifted or lowered by the cartridge elevator 30.

The cartridge elevator 30 is connected to the vacuum chamber 10. As shown in FIGS. 1 to 6, so as to sequentially lift or lower the cartridge 20, the cartridge elevator 30 may include: a fixed frame 31 fixed to the vacuum chamber 10; a screw rod 32 installed on the fixed frame 31; a rotation motor 33 configured to rotate the screw rod 32; a guide member 34 installed on the fixed frame 31; a movable base 35 into which the screw rod 32 is inserted in a screw engagement manner so as to lift or lower the movable base 35 along the guide member 34; an extension rod 36 installed on the movable base 35 and extending from the movable base 35 to the cartridge 20; and a bellows tube 37 installed between the movable base 35 and the vacuum chamber 10 and enclosing the extension rod 36.

Therefore, the cartridge elevator 30 may operate as follows. If the rotation motor 33 is rotated by a predetermined amount per rotation, the screw rod 32 is rotated, and thus the movable base 35 is sequentially lifted along the guide member 34. Then, the covers 2 stacked on the cartridge 20 are sequentially transferred by the cover transfer device 40 (described later). Therefore, although there is an empty space in the cartridge 20, the cartridge 20 may sequentially provide the covers 2 so that the uppermost cover 2 may always be placed at a constant height.

In addition, as shown in FIG. 3, the cartridge elevator 30 may further include limit optical sensors 38 attached to the fixed frame 31 to detect a detection protrusion 35*a* disposed on the movable base 35.

Therefore, the uppermost position, the lowermost position, or an increased height of the cartridge 20 may be detected using the limit optical sensors 38 so as to help an operator to check operational states or inform the operator of a time point for adding new covers 2.

In addition, as shown in FIGS. 1 to 6, the cover transfer device 40 is installed in the internal space A to transfer the covers 2 one by one from the cartridge 20. The cover transfer device 40 may include: an elastic fingers 44 configured to be selectively closed or opened by a first wedge member 42 and a second wedge member 43 vertically moved by a first cylinder 41; and a finger table 47 on which the elastic fingers 44 are installed, the finger table 47 being configured to be moved by a second cylinder 45 along a finger transfer rail 46 installed in the vacuum chamber 10.

Therefore, the cover transfer device 40 may operate as follows. If the covers 2 are lifted to a certain height by the cartridge elevator 30, the elastic fingers 44 opened by the first wedge member 42 is closed to hold one of the covers 2 as the first wedge member 42 is lifted by the first cylinder 41. Then, the elastic fingers 44 holding the cover 2 are moved together with the finger table 47 toward the cover-rest head 50 by using the second cylinder 45. Thereafter, the second wedge member 43 is lowered to open the elastic fingers 44 and to thus place the cover 2 on the cover-rest head 50.

That is, a driving mechanism such as a cylinder or a motor is not installed in the vacuum chamber 10 but is installed outside the vacuum chamber 10. Therefore, the covers 2 may be kept clean and protected from foreign substances, and the vacuum chamber 10 may be maintained at a high degree of vacuum.

FIG. 7 is a perspective view illustrating the cover-rest head 50 illustrated in FIG. 1.

Referring to FIG. 7, the cover-rest head 50 configured to receive a cover 2 from the cover transfer device 40 may include a head body 51; a heater 52 installed on the head body 51 to heat the cover 2; and an elastic guide 54 connected to an elastic spring 53 installed on the head body 51 for being elastically moved backward to a lower side of the cover 2 when a force is applied to the elastic guide 54, the elastic guide 54 including a guide groove 54*a* to guide the cover 2.

Therefore, when the cover 2 is placed on the cover-rest head 50, the cover 2 may be guided and aligned by the guide groove 54*a* of the elastic guide 54, and the cover 2 placed on the cover-rest head 50 may be previously heated to a high temperature by the heater 52. If the cover-rest head 50 on which the cover 2 is placed is lifted toward the glass plate 1 by the head elevator 60, the elastic guide 54 is first brought into contact with the glass plate 1 and elastically moved backward, and then the cover 2 aligned by the guide groove 54*a* may be precisely placed on the vacuum hole H of the glass plate 1 for sealing the vacuum hole H.

The head elevator 60 is used to lift the cover-rest head 50 to the vacuum hole H of the glass plate 1. To this end, as shown in FIGS. 1 to 6, the head elevator 60 may include: a fixed frame 61 fixed to the vacuum chamber 10; a screw rod 62 installed on the fixed frame 61, a rotation motor 63 configured to rotate the screw rod 62; a guide member 64 installed on the fixed frame 61; a movable base 65 into which the screw rod 62 is inserted in a screw engagement manner so as to lift or lower the movable base 65 along the guide member 64; an extension rod 66 installed on the movable base 65 and extending from the movable base 65 to the cover-rest head 50; and a bellows tube 67 installed between the movable base 65 and the vacuum chamber 10 and enclosing the extension rod 66.

Therefore, the head elevator 60 may operate as follows. If the rotation motor 63 is rotated, the screw rod 62 is rotated, and thus the movable base 65 is lifted along the guide member 64 so that the cover-rest head 50 on which the cover 2 is placed may be lifted toward the glass plate 1. Next, if the cover 2 is placed on the glass plate 1 for sealing the glass plate 1, the rotation motor 63 may be rotated in the reverse direction to lower the movable base 65 for the next cover 2.

In addition, as shown in FIGS. 1 to 6, according to the embodiments of the present invention, the sealing apparatus 100 for vacuum window manufacturing equipment may further include a position adjustment device 70 installed between the extension rod 66 and the cover-rest head 50 and configured to move the cover-rest head 50 in x-axis and y-axis directions.

As shown in FIGS. 1 to 6, the position adjustment device 70 may include: a y-axis movable base 73 configured to be moved in the y-axis direction along a y-axis rail 71 installed on the fixed frame 61 by a y-axis transfer motor 72 rotating a cam C; and an x-axis movable base 76 configured to be moved in the x-axis direction by an x-axis transfer motor 75 along an x-axis rail 74 installed on the y-axis movable base 73, the x-axis movable base 76 being connected to the extension rod 66.

Therefore, the cover-rest head 50 connected to the extension rod 66 may be precisely moved in the x-axis and y-axis directions by properly rotating the x-axis transfer motor 75 and the y-axis transfer motor 72, so as to exactly align the cover-rest head 50 with the vacuum hole H of the glass plate 1.

In addition, as shown in FIG. 4, the position adjustment device 70 may include limit optical sensors 78 attached to the fixed frame 61 to detect a detection protrusion 77 disposed on the y-axis movable base 73.

Therefore, the position of the cover-rest head 50 connected to the extension rod 66 may be detected using the limit optical sensors 78 to help an operator to precisely adjust the cover-rest head 50.

INDUSTRIAL APPLICABILITY

The present invention is not limited to the above-described embodiments, and it will be understood by those skilled in the art that various changes in form and details may be made in the embodiments without departing from the scope of the invention.

Therefore, the scope of the invention is not limited to the descriptions of the embodiments but is defined by the following claims.

The invention claimed is:

1. A sealing apparatus for vacuum window manufacturing equipment, the sealing apparatus being configured to cover a vacuum hole formed in at least one glass plate for a vacuum window with a cover, the sealing apparatus comprising:

- a vacuum chamber comprising an internal space and configured to be evacuated for forming a vacuum therein;
- a cartridge installed in the internal space and accommodating a plurality of covers;
- a cartridge elevator installed on the vacuum chamber and configured to sequentially lift or lower the cartridge;
- a cover transfer device installed in the internal space and configured to transfer the covers one by one from the cartridge;
- a cover-rest head configured to receive a cover from the cover transfer device; and
- a head elevator configured to lift up the cover-rest head to the vacuum hole of the glass plate.

2. The sealing apparatus of claim 1, wherein the vacuum chamber comprises:

- a door on a side thereof; and
- a window configured to allow checking an inside state of the vacuum chamber.

3. The sealing apparatus of claim 1, wherein the cartridge elevator comprises:

- a fixed frame fixed to the vacuum chamber;
- a screw rod installed on the fixed frame;
- a rotation motor configured to rotate the screw rod;
- a guide member installed on the fixed frame;
- a movable base into which the screw rod is inserted in a screw engagement manner so that the movable base is lifted or lowered along the guide member;
- an extension rod installed on the movable base and extending from the movable base to the cartridge; and
- a bellows tube installed between the movable base and the vacuum chamber and enclosing the extension rod.

4. The sealing apparatus of claim 1, wherein the cartridge elevator further comprises a limit optical sensor installed on the fixed frame and configured to detect a detection protrusion on the movable base.

5. The sealing apparatus of claim 1, wherein the cover transfer device comprises:

- elastic fingers configured to be selectively closed or opened by a first wedge member and a second wedge member lifted or lowered by a first cylinder; and
- a finger table on which the elastic fingers are installed, the finger table being configured to be moved by a second cylinder along a finger transfer rail installed in the vacuum chamber.

6. The sealing apparatus of claim 1, wherein the cover-rest head comprises:

- a head body;
- a heater installed on the head body and configured to heat the cover; and
- an elastic guide connected to an elastic spring installed on the head body and configured to elastically move backward to a lower side of the cover when a force is applied thereto, the elastic guide comprising a guide groove to guide the cover.

7. The sealing apparatus of claim 1, wherein the head elevator comprises:

- a fixed frame fixed to the vacuum chamber;
- a screw rod installed on the fixed frame;
- a rotation motor configured to rotate the screw rod;
- a guide member installed on the fixed frame;
- a movable base into which the screw rod is inserted in a screw engagement manner so that the movable base is lifted or lowered along the guide member;
- an extension rod installed on the movable base and extending from the movable base to the cover-rest head; and
- a bellows tube installed between the movable base and the vacuum chamber and enclosing the extension rod.

8. The sealing apparatus of claim 7, wherein the head elevator further comprises a position adjustment device installed between the extension rod and the cover-rest head and configured to move the cover-rest head in x-axis and y-axis directions.

9. The sealing apparatus of claim 8, wherein the position adjustment device comprises:

- a y-axis movable base configured to be moved in the y-axis direction by a y-axis transfer motor along a y-axis rail installed on the fixed frame; and
- an x-axis movable base configured to be moved in the x-axis direction by an x-axis transfer motor along an x-axis rail installed on the y-axis movable base, the x-axis movable base being connected to the extension rod.

10. The sealing apparatus of claim 9, wherein the position adjustment device further comprises a limit optical sensor installed on the fixed frame and configured to detect a detection protrusion on the y-axis movable base.

* * * * *